(12) United States Patent  
Kishima et al.

(10) Patent No.: US 9,338,408 B2
(45) Date of Patent: May 10, 2016

(54) IMAGE OBTAINING APPARATUS, IMAGE OBTAINING METHOD, AND IMAGE OBTAINING PROGRAM

(71) Applicant: Sony Corporation, Tokyo (JP)

(72) Inventors: Koichiro Kishima, Kanagawa (JP); Ryu Narusawa, Kanagawa (JP); Fumiyasu Suzuki, Saitama (JP)

(73) Assignee: Sony Corporation, Tokyo (JP)

( * ) Notice: Subject to any disclaimer, the term of this patent is extended or adjusted under 35 U.S.C. 154(b) by 502 days.

(21) Appl. No.: 13/674,424

(22) Filed: Nov. 12, 2012

(65) Prior Publication Data

US 2013/0135456 A1  May 30, 2013

(30) Foreign Application Priority Data

Nov. 29, 2011  (JP) ................................ 2011-260271

(51) Int. Cl.
*H04N 7/18* (2006.01)
*G02B 21/36* (2006.01)
*G02B 21/16* (2006.01)

(52) U.S. Cl.
CPC .................. *H04N 7/18* (2013.01); *G02B 21/16* (2013.01); *G02B 21/365* (2013.01)

(58) Field of Classification Search
CPC ......... H04N 7/18; G02B 21/365; G02B 21/16
See application file for complete search history.

(56) References Cited

U.S. PATENT DOCUMENTS

| | | | |
|---|---|---|---|
| 2001/0045529 A1* | 11/2001 | Iketaki et al. | 250/493.1 |
| 2003/0103662 A1* | 6/2003 | Finkbeiner | 382/128 |
| 2009/0045353 A1* | 2/2009 | Alexeevich et al. | 250/482.1 |
| 2010/0321484 A1* | 12/2010 | Kishima | 348/79 |

FOREIGN PATENT DOCUMENTS

JP   2011-107669 A   6/2011

OTHER PUBLICATIONS

Fluorescence in situ hybridization method (FISH), HER2 Testing, 2011, 28 pages.

\* cited by examiner

*Primary Examiner* — Jefferey Harold
*Assistant Examiner* — Sean Haiem
(74) *Attorney, Agent, or Firm* — Wolf, Greenfield & Sacks, P.C.

(57) ABSTRACT

An image obtaining apparatus includes: a light source configured to irradiate a biological sample having a fluorescent label with excitation light, the excitation light exciting the fluorescent label; an optical system including an objective lens, the objective lens being configured to magnify an imaging target of the biological sample; an image sensor configured to form an image of the imaging target magnified by the objective lens; a movement controller configured to move a focus position of the optical system in an imaging range including at least a range corresponding to the thickness of the imaging target; and a data processing unit configured to expose the image sensor to light while moving the focus position in the imaging range and obtain a fluorescent image of the biological sample, to thereby calculate distribution information of the fluorescent label in a thickness direction of the imaging target based on the fluorescent image.

12 Claims, 13 Drawing Sheets

IMAGE OBTAINING APPARATUS, IMAGE OBTAINING METHOD, AND IMAGE OBTAINING PROGRAM

BACKGROUND

The present disclosure relates to an image obtaining apparatus, an image obtaining method, and an image obtaining program obtaining an image by using a microscope.

In the past, in the treatment of breast cancer and the like, there has been used a method in which a surgically-resected slice of tissue is analyzed and based on the analysis result, a medicine to be administered to a patient after the operation is selected.

For example, a surgically-resected slice of tissue is subjected to fluorescent staining by use of the HER-2 DNA probe kit from Abbott Laboratories. When the slice of tissue is irradiated with excitation light, HER-2/neu genes emit red fluorescence, and alpha-satellite DNA sequences emit green fluorescence. Thus, the HER-2/neu genes are marked by read bright points, and the alpha-satellite DNA sequences are marked by green bright points.

In diagnosis using a fluorescence microscope, the number of red bright points and that of green bright points are counted. In the case where the number of red bright points is 2.2 times or more larger than that of green bright points, a HER-2 positive reaction is determined. In this case, when a molecular target drug called Herceptin (trade name) from F. Hoffmann-La Roche Ltd. is administered to a patient, a significantly good prognosis of the patient after the operation is expected (see HER-2 Examination Guide, 3rd edition, Trastuzumab Pathology Working Group, September 2009, p. 10 <FISH-method determination method>).

Further, Japanese Patent Application Laid-open No. 2011-107669 discloses a technology of detecting bright points, which mark a cell, from a fluorescent image of a biological sample. Japanese Patent Application Laid-open No. 2011-107669 discloses a biological-sample-image-obtaining apparatus. The biological-sample-image-obtaining apparatus images a target site of a biological sample, which is magnified by an objective lens. In the imaging, the focus of the objective lens is appropriately moved so that the accuracy of detecting bright points can be improved.

SUMMARY

In the diagnosis using the fluorescence microscope as described above and the like, it is important to properly set the focus position of an optical system. For example, a sample such as a slice of tissue is placed on a slide glass and a cover glass is placed thereon via a sealing agent. The preparation thus created is set on the stage of the fluorescence microscope. At this time, due to various reasons such as the uneven thickness of the sample, the uneven thickness of the slide glass, and dust caught between the slide glass and the stage, it is necessary to adjust the focus position for each preparation to be mounted on the stage.

Meanwhile, as the numerical aperture (NA) of an optical system becomes higher, the brightness of bright points and the resolution of an image to be observed by using a fluorescence microscope become higher. Because of this, with use of a microscope using an optical system whose numerical aperture (NA) is high, the correctness of the above diagnosis tends to be improved. When the numerical aperture (NA) of the optical system is increased, however, the focal depth becomes narrow and the focus position is easily missed. In other words, the above-mentioned adjustment of the focus position is difficult to be performed.

In this regard, for example, the following method may be employed. That is, a focus position is changed at intervals smaller than a focal depth, imaging is performed for each change, and the captured images are analyzed to retrieve a focus position. In this method, however, it is necessary to capture a large number of images and use a large-capacity memory for storing image data corresponding to the captured images. In addition, it is necessary to refer to a plurality of image data items in order to calculate the focus position, which is inefficient because a lot of man-hours are involved.

In view of the circumstances as described above, it is desirable to provide an image obtaining apparatus, an image obtaining method, and an image obtaining program that are capable of efficiently imaging a biological sample having a fluorescent label.

According to an embodiment of the present disclosure, there is provided an image obtaining apparatus including a light source, an optical system, an image sensor, a movement controller, and a data processing unit.

The light source is configured to irradiate a biological sample having a fluorescent label with excitation light, the excitation light exciting the fluorescent label.

The optical system includes an objective lens, the objective lens being configured to magnify an imaging target of the biological sample.

The image sensor is configured to form an image of the imaging target magnified by the objective lens.

The movement controller is configured to move a focus position of the optical system in an imaging range including at least a range corresponding to the thickness of the imaging target.

The data processing unit is configured to expose the image sensor to light while moving the focus position in the imaging range and obtain a fluorescent image of the biological sample, to thereby calculate distribution information of the fluorescent label in a thickness direction of the imaging target based on the fluorescent image.

In the image obtaining apparatus, the focus position of the optical system is moved in the imaging range including at least a thickness range of the imaging target. During the movement, the image sensor is exposed to light and a fluorescent image of the biological sample is obtained. Then, based on the fluorescent image of the biological sample, the distribution information of the fluorescent labels in the thickness direction of the imaging target is calculated. Thus, for example, it is possible to easily calculate the focus position for appropriately imaging the fluorescent label. As a result, it is possible to efficiently image the biological sample having a fluorescent label.

The movement controller may be configured to move the focus position in the thickness direction of the imaging target and move the focus position in a plane direction vertical to the thickness direction.

The data processing unit may be configured to calculate the distribution information based on a shape of the fluorescent label of the fluorescent image.

The movement controller may be configured to move the focus position of the optical system in each of a plurality of divided imaging ranges that divide the imaging range in the thickness direction of the imaging target. In this case, the data processing unit may be configured to calculate the distribution information based on a plurality of fluorescent images obtained in the plurality of divided imaging ranges.

The data processing unit may be configured to calculate a frequency component of each of the plurality of fluorescent images and calculate the distribution information based on a fluorescent image having a highest maximum-frequency component.

The data processing unit may be configured to calculate a brightness of each of the plurality of fluorescent images and calculate the distribution information based on a fluorescent image having a maximum brightness.

The image obtaining apparatus may further include an imaging mode determining unit configured to determine an imaging mode for the biological sample based on the calculated distribution information.

According to another embodiment of the present disclosure, there is provided an image obtaining method including: irradiating a biological sample having a fluorescent label with excitation light, the excitation light exciting the fluorescent label; moving a focus position of an optical system in an imaging range including at least a range corresponding to the thickness of an imaging target of the biological sample, the optical system including an objective lens configured to magnify the imaging target; exposing an image sensor to light while moving the focus position in the imaging range, the image sensor being configured to form an image of the imaging target magnified by the objective lens, and obtaining a fluorescent image of the biological sample; and calculating distribution information of the fluorescent label in a thickness direction of the imaging target based on the obtained fluorescent image.

According to still another embodiment of the present disclosure, there is provided an image obtaining program causing a computer to execute: irradiating a biological sample having a fluorescent label with excitation light from a light source, the excitation light exciting the fluorescent label; moving a focus position of an optical system in an imaging range including at least a range corresponding to the thickness of an imaging target of the biological sample, the optical system including an objective lens configured to magnify the imaging target; exposing an image sensor to light while moving the focus position in the imaging range, the image sensor being configured to form an image of the imaging target magnified by the objective lens, and obtaining a fluorescent image of the biological sample; and calculating distribution information of the fluorescent label in a thickness direction of the imaging target based on the obtained fluorescent image.

As described above, according to the present disclosure, it is possible to efficiently image a biological sample having a fluorescent label.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

[Structure of Image Obtaining Apparatus]

Figure 1:
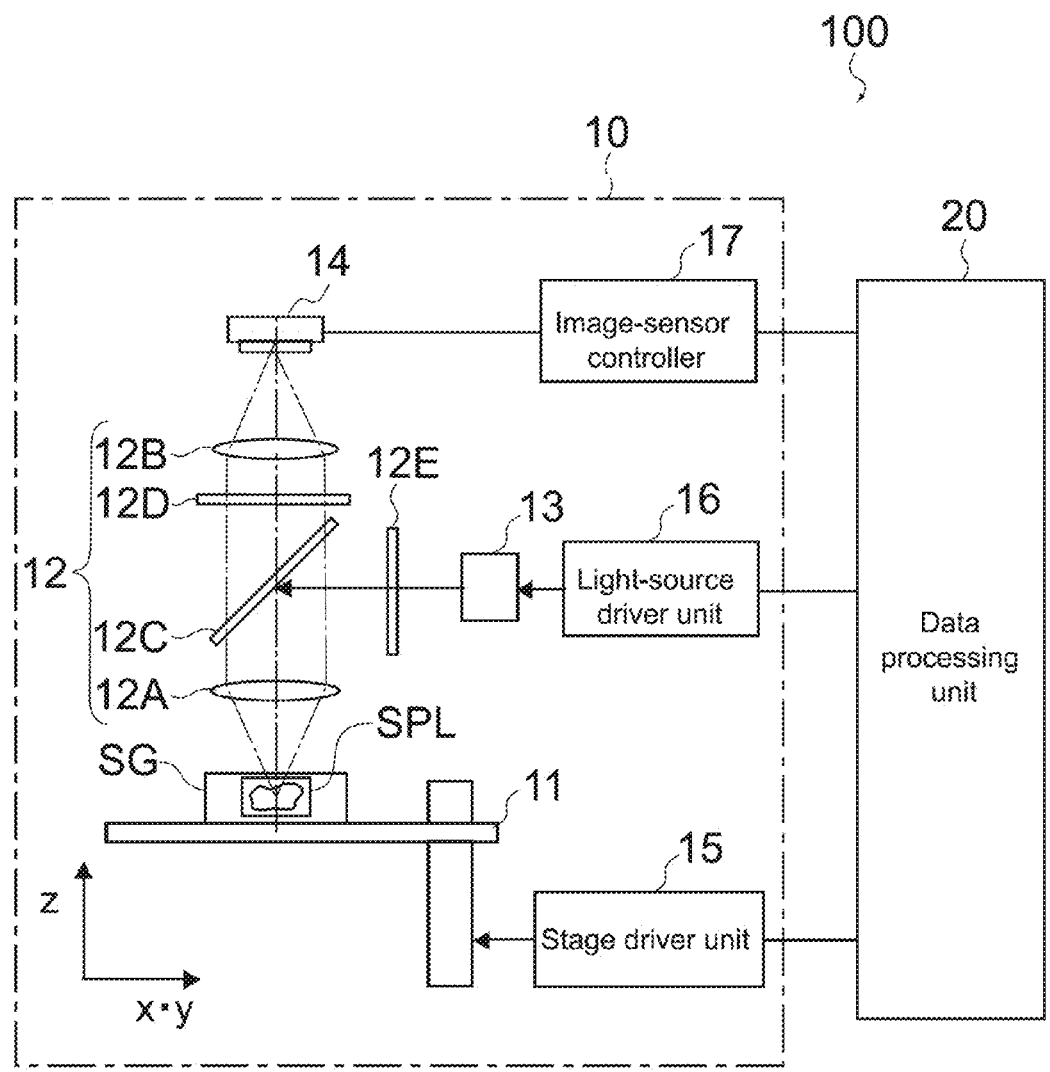
FIG. 1 is a schematic diagram showing an image obtaining apparatus according to an embodiment of the present disclosure.

FIG. 1 is a schematic diagram showing an image obtaining apparatus 100 according to an embodiment of the present disclosure. As shown in FIG. 1, the image obtaining apparatus 100 of this embodiment includes a microscope 10 and a data processing unit 20.

[Structure of Microscope]

The microscope 10 includes a stage 11, an optical system 12, a light source 13, and an image sensor 14. The stage 11 has a mount surface. A biological sample SPL is mounted on the mount surface. Examples of the biological sample SPL include a slice of tissue, a cell, and a biopolymer such as a chromosome. The stage 11 is capable of moving in the horizontal direction (X-Y plane direction) and in the vertical direction (Z-axis direction) with respect to the mount surface.

The vertical direction (Z-axis direction) of the mount surface corresponds to the thickness direction of the biological sample SPL. The horizontal direction (X-Y plane direction) of the mount surface corresponds to a plane direction vertical to the thickness direction.

Figure 2:
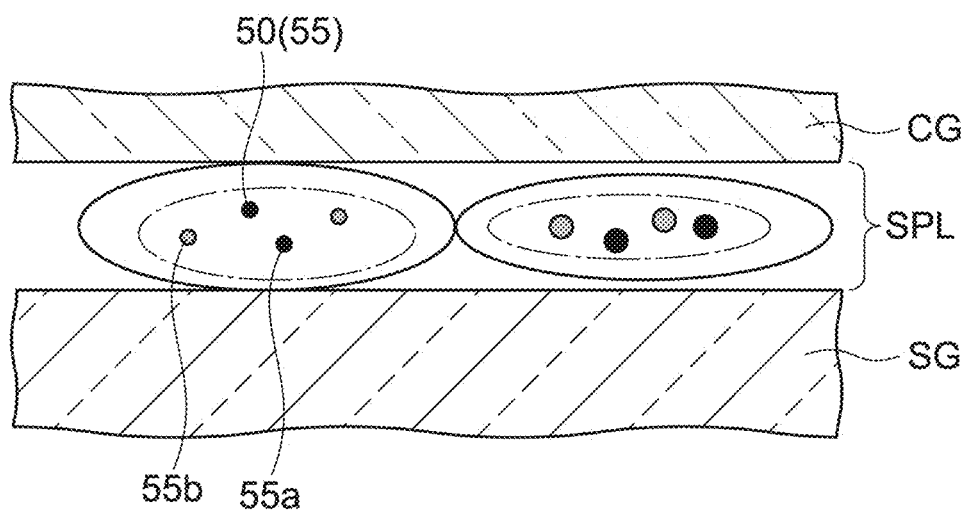
FIG. 2 is a diagram showing a biological sample mounted on a stage shown in FIG. 1, in the direction from the side of the stage.

FIG. 2 is a diagram showing the biological sample SPL mounted on the above-mentioned stage 11. FIG. 2 shows the biological sample SPL in the direction from the side of the stage 11. As shown in FIG. 2, the biological sample SPL has a thickness of several μm to several tens of μm in the Z direction, for example. The biological sample SPL is sandwiched between a slide glass SG and a cover glass CG and is fixed by a predetermined fixing method. The thickness of the slide glass SG is about 1 mm, for example. The thickness of the cover glass CG is about 0.15 to 0.17 mm, for example.

The biological sample SPL is stained with a fluorescence staining reagent. The fluorescence staining reagent is a stain that is irradiated with excitation light from the same light source to thereby emit fluorescence. As the fluorescence staining reagent, for example, DAPI(4',6-diamidino-2-phenylindole), SpAqua, SpGreen, or the like may be used.

The biological sample SPL is stained so that a living tissue 50 as a target of the biological sample SPL is provided with a fluorescent label. When the fluorescent label is irradiated with predetermined excitation light, predetermined fluorescence is emitted from the fluorescent label. Thus, in the case where the biological sample SPL is imaged and a fluorescent image is generated, the living tissues 50 as a target are marked by bright points (hereinafter, referred to as "fluorescent markers 55") having predetermined colors.

With reference to FIG. 1 again, the optical system 12 is arranged above the stage 11. The optical system 12 includes an objective lens 12A, an imaging lens 12B, a dichroic mirror 12C, an emission filter 12D, and an excitation filter 12E. The light source 13 is, for example, a light bulb such as a mercury lamp, or an LED (Light Emitting Diode). Fluorescent labels in a biological sample SPL are irradiated with excitation light from the light source 13.

In a case of obtaining a fluorescent image of the biological sample SPL, the excitation filter 12E only causes light, which has an excitation wavelength for exciting a fluorescent dye, to pass through, out of light emitted from the light source 13, to thereby generate excitation light. The excitation light, which has passed through the excitation filter 12E and enters the dichroic mirror 12C, is reflected by the dichroic mirror 12C, and is guided to the objective lens 12A. The objective lens 12A condenses the excitation light on the biological sample SPL. Then, the objective lens 12A and the imaging lens 12B magnify the image of the biological sample SPL at a predetermined power and form the magnified image in an imaging area of the image sensor 14.

When the biological sample SPL is irradiated with the excitation light, the stain emits fluorescence. The stain is bound to each tissue of the biological sample SPL. The fluorescence passes through the dichroic mirror 12C via objective lens 12A and reaches the imaging lens 12B via the emission filter 12D. The emission filter 12D absorbs light, which is magnified by the above-mentioned objective lens 12A and has passed through the excitation filter 12E. Only part of color light passes through the emission filter 12D. As described above, the imaging lens 12B magnifies an image of the color light, from which outside light is lost. The imaging lens 12B forms an image on the image sensor 14.

As the image sensor 14, for example, a CCD (Charge Coupled Device), a CMOS (Complementary Metal Oxide Semiconductor) image sensor, or the like is used. The image sensor 14 has a photoelectric conversion element, which receives light of RGB (Red, Green, Blue) colors separately and converts the light of colors into electric signals. The image sensor 14 is a color imager, which obtains a color image based on incident light.

The data processing unit 20 drives the light source 13. The data processing unit 20 obtains a fluorescent image of the biological sample SPL by using the image sensor 14. The data processing unit 20 stores the fluorescent image as sample data.

[Structure of Data Processing Unit]

Figure 3:
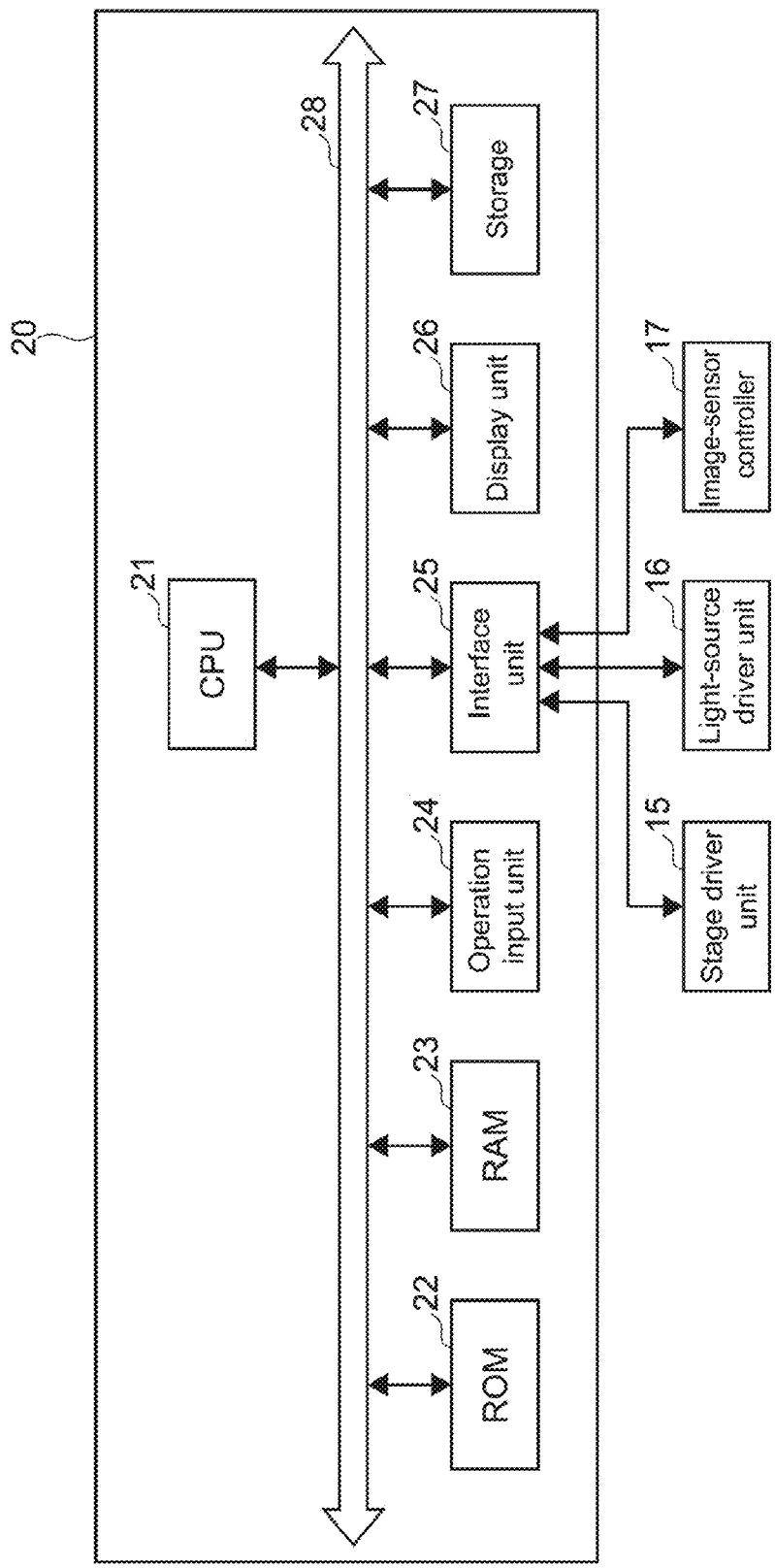
FIG. 3 is a block diagram showing a hardware structure of a data processing unit shown in FIG. 1.

FIG. 3 is a block diagram showing the hardware structure of the data processing unit 20. The data processing unit 20 is configured by, for example, a PC (Personal Computer). The data processing unit 20 stores a fluorescent image of the biological sample SPL, which is obtained from the image sensor 14, as digital image data of an arbitrary format such as JPEG (Joint Photographic Experts Group), for example.

As shown in FIG. 3, the data processing unit 20 includes a CPU (Central Processing Unit) 21, a ROM (Read Only Memory) 22, a RAM (Random Access Memory) 23, an operation input unit 24, an interface unit 25, a display unit 26, and storage 27. Those blocks are connected to each other via a bus 28.

The ROM 22 is fixed storage for storing data and a plurality of programs such as firmware for executing various types of processing. The RAM 23 is used as a work area of the CPU 21 and temporarily stores an OS (Operating System), various applications being executed, and various types of data being processed.

The storage 27 is a nonvolatile memory such as an HDD (Hard Disk Drive), a flash memory, or another solid memory, for example. The OS, various applications, and various types of data are stored in the storage 27. In particular, in this embodiment, fluorescent image data captured by the image sensor 14 and an image processing application for processing fluorescent image data are also stored in the storage 27.

The interface unit 25 is connected to a control board including a stage driver unit 15, a light-source driver unit 16, and an image-sensor controller 17. The stage driver unit 15 drives the stage 11 of the microscope 10. The light-source driver unit 16 drives the light source 13 of the microscope 10. The image-sensor controller 17 drives the image sensor 14 of the microscope 10. Signals are sent and received between the control board and the data processing unit 20 according to a predetermined communication standard.

The CPU 21 expands, in the RAM 23, programs corresponding to instructions received from the operation input unit 24 out of a plurality of programs stored in the ROM 22 or in the storage 27. The CPU 21 arbitrarily controls the display unit 26 and the storage 27 according to the expanded programs.

The operation input unit 24 is an operating device such as a pointing device (for example, mouse), a keyboard, or a touch panel.

The display unit 26 is a liquid crystal display, an EL (Electro-Luminescence) display, a plasma display, a CRT (Cathode Ray Tube) display, or the like. The display unit 26 may be built in the data processing unit 20 or may be externally connected to the data processing unit 20.

[Processing of Obtaining Biological-Sample Image]

In this embodiment, in an imaging range including a range corresponding to the thickness of a site to be an imaging target in the biological sample SPL, a focus position of the optical system 12 is moved. During the movement of the focus position, the image sensor 14 is exposed to light so that a fluorescent image of the biological sample SPL is obtained. Based on the fluorescent image, distribution information of fluorescent labels in the thickness direction of the imaging target is calculated. The distribution information of fluorescent labels corresponds to distribution information of the living tissues 50 as a target marked by the fluorescent markers 55.

Based on the calculated distribution information, for example, a focus position for properly imaging the fluorescent markers 55 is easily calculated. As a result, the biological sample SPL having the fluorescent markers 55 is efficiently imaged, which will be described later in detail.

The CPU 21 of the data processing unit 20 expands, in the RAM 23, a program corresponding to an instruction received from the operation input unit 24 out of a plurality of programs stored in the ROM 22 or the storage 27. The CPU 21 executes the processing of obtaining a biological-sample image based on the expanded program (image obtaining program).

Figure 4:
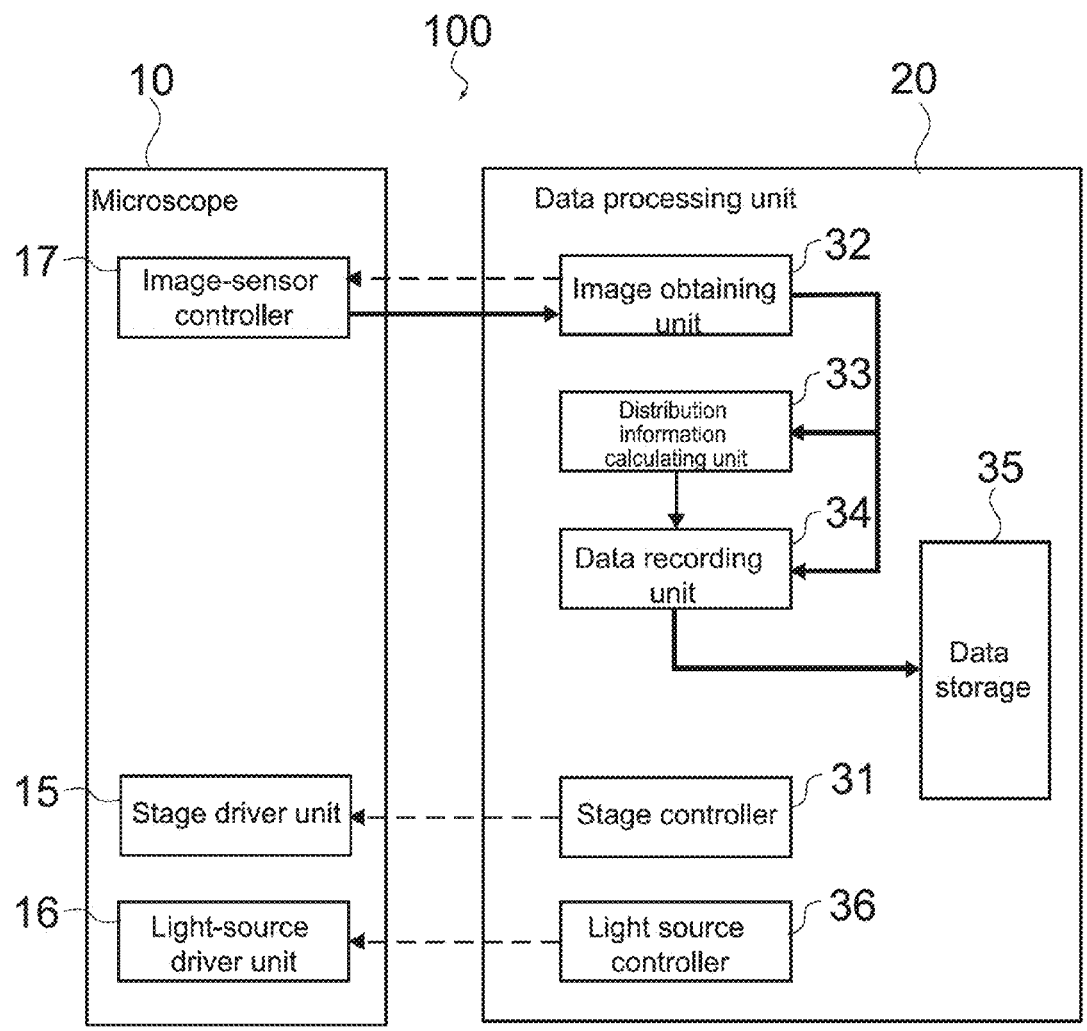
FIG. 4 is a functional block diagram showing processing of obtaining a biological-sample image according to this embodiment.
Figure 5:
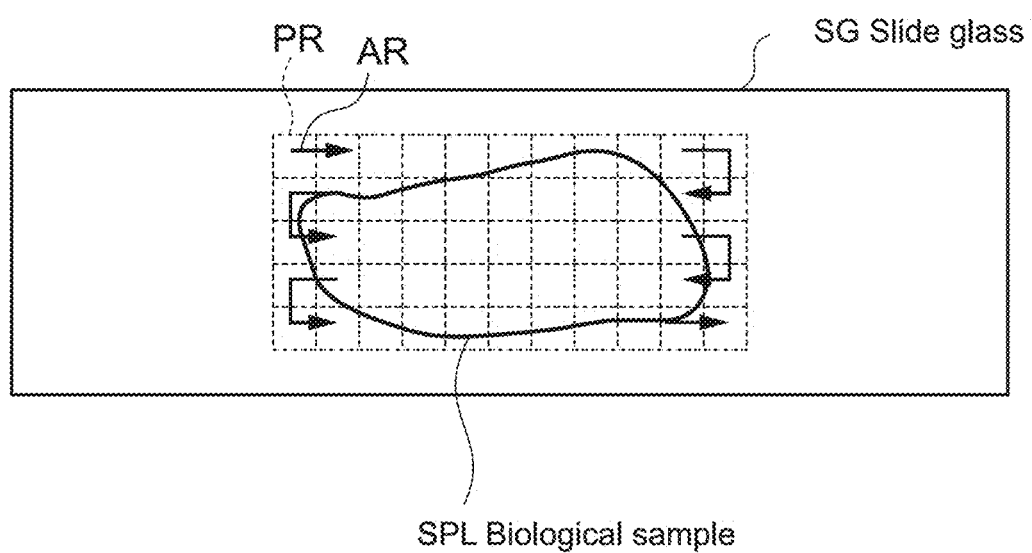
FIG. 5 is a diagram showing imaging target areas imaged by the image obtaining apparatus of FIG. 1.

FIG. 4 is a functional block diagram for the processing of obtaining a biological-sample image. In FIG. 4, a stage controller 31 (movement controller) sequentially moves the stage 11 such that a target site of the biological sample SPL (hereinafter, also referred to as "sample site") is in an imaged area. For example, as shown in FIG. 5, the stage controller 31 allocates the biological sample SPL to the imaged areas AR. Note that, in FIG. 5, areas of the biological sample SPL to be allocated to the imaged areas AR are not overlapped with each other. Alternatively, part of an area may be overlapped with part of an adjacent area.

Further, the stage controller 31 moves the stage 11 every time a sample site to be a target is moved in the imaged areas AR. Thus, the focus of the optical system with respect to the sample site is moved. In this embodiment, the movement of the stage 11 is controlled so that the focus is moved in the thickness direction of the sample site (Z-axis direction (optical-axis direction of objective lens 12A) and the focus is moved in a plane direction vertical to the thickness direction (X-Y plane direction) at the same time.

As a specific example, the stage controller 31 moves the stage 11 according to the following expressions.

$$x(t) = x_0 + L \times \cos\left(2\pi \frac{t}{t_{ex}}\right) \quad (1)$$

$$y(t) = y_0 + L \times \sin\left(2\pi \frac{t}{t_{ex}}\right) \quad (2)$$

$$z(t) = z_{start} + (z_{end} - z_{start})\frac{t}{t_{ex}} \quad (3)$$

As shown in Expressions (1) and (2), the stage 11 is moved along a circle having a radius L, which has the center at coordinates $(x_0, y_0)$ on the X-Y plane. The position of the center coordinates $(x_0, y_0)$ and the size of the radius L may be arbitrarily set as long as the imaged areas AR can be imaged.

The "$t_{ex}$" in Expressions (1) and (2) represents an exposure time. The stage 11 is circularly moved while exposure of the image sensor 14 is being performed. In other words, in this embodiment, the image sensor 14 is exposed to light while the stage 11 is being circularly moved.

As shown in Expression (3), the stage 11 is moved also along the Z-axis direction. The stage 11 is moved at constant speed from a movement start position, $z_{start}$, to a movement end position, $z_{end}$, in accordance with the exposure time of the image sensor 14.

Figure 6A:
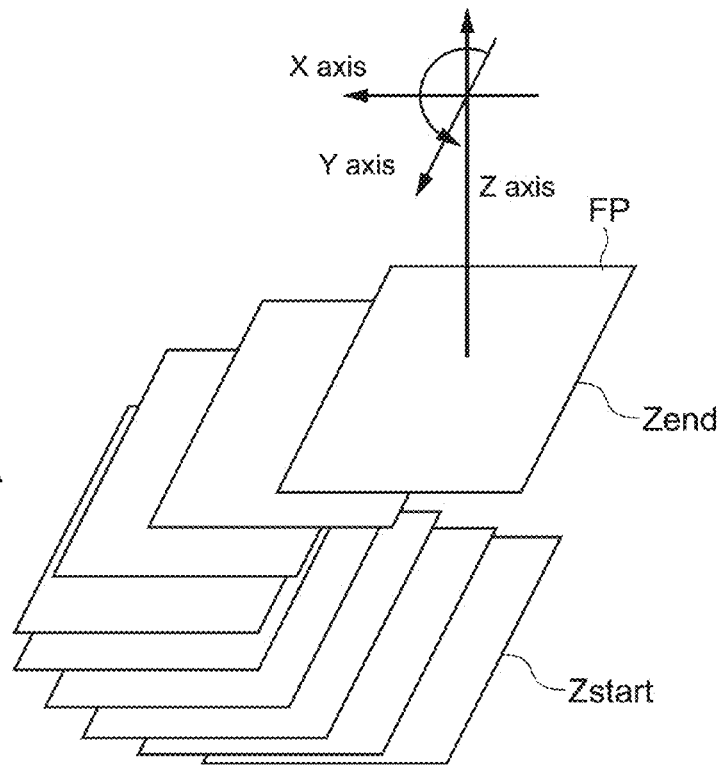
FIGS. 6A and 6B are schematic diagrams each showing a movement of a focus position of an optical system in the case where the stage shown in FIG. 1 is moved.
Figure 6B:
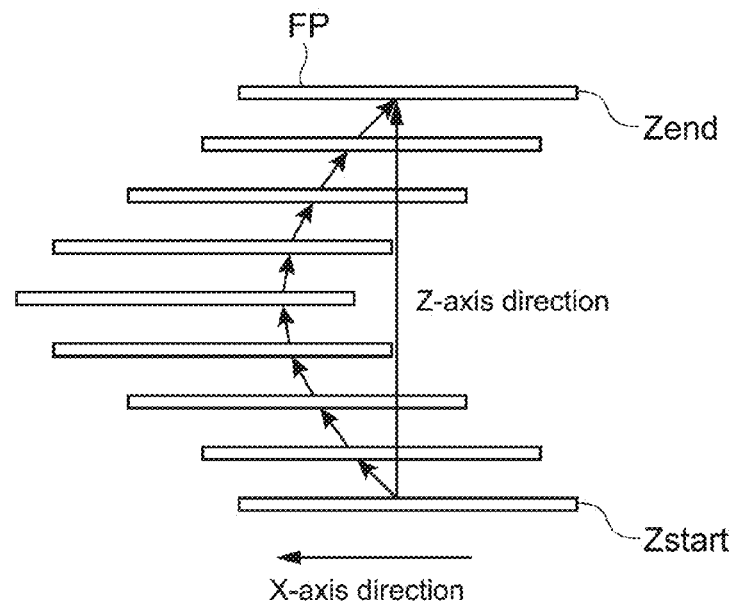

FIG. 6 are schematic diagrams each showing a movement of the focus position of the optical system in the case where the stage 11 is moved. As shown in FIGS. 6A and 6B, a focal plane FP including the focus position is moved from $z_{start}$ to $z_{end}$ along the Z-axis direction. Along with the movement, the focal plane FP is circularly moved about the center coordinates $(x_0, y_0)$ on the X-Y plane.

An image obtaining unit 32 (exposure controller) sends instructions to the image-sensor controller 17 to expose the image sensor 14 to light from a time point at which the movement of the stage 11 is stated to a time point at which the movement thereof is ended every time a target sample site is moved to the imaged areas AR by the stage controller 31.

When the movement of the stage 11 is ended, the image obtaining unit 32 obtains images of the sample site, which are obtained by the exposure performed between the time point at which the movement is started and the time point at which the movement is ended, from the image sensor 14 via the image-sensor controller 17. Then, the image obtaining unit 32 combines the images of the sample site allocated to the imaged areas AR with one another by using a predetermined combining algorithm, to thereby generate the entire biological sample image.

Figure 7A:
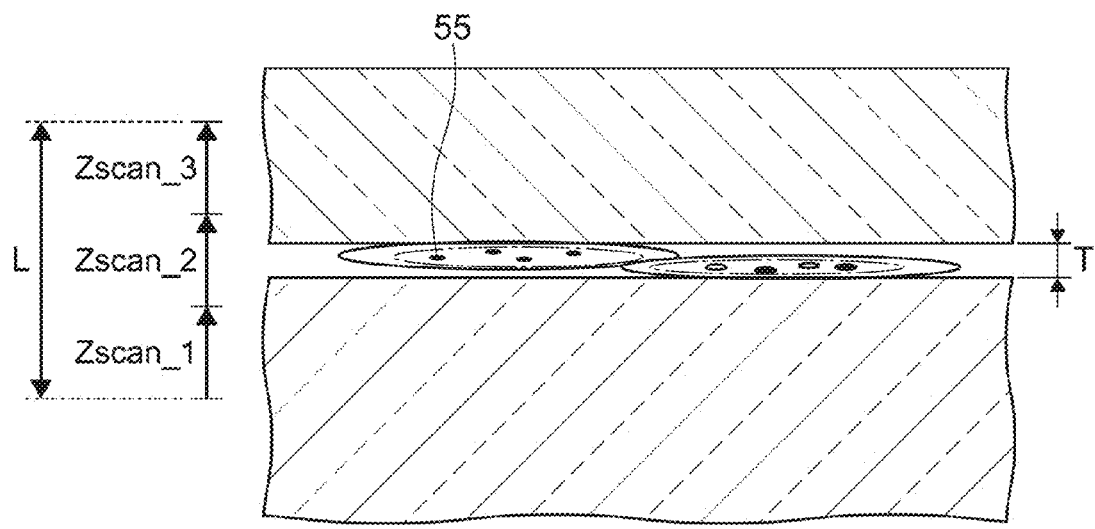
FIGS. 7A and 7B are schematic diagrams for describing in detail a movement range of the focus position according to the embodiment.
Figure 7B:
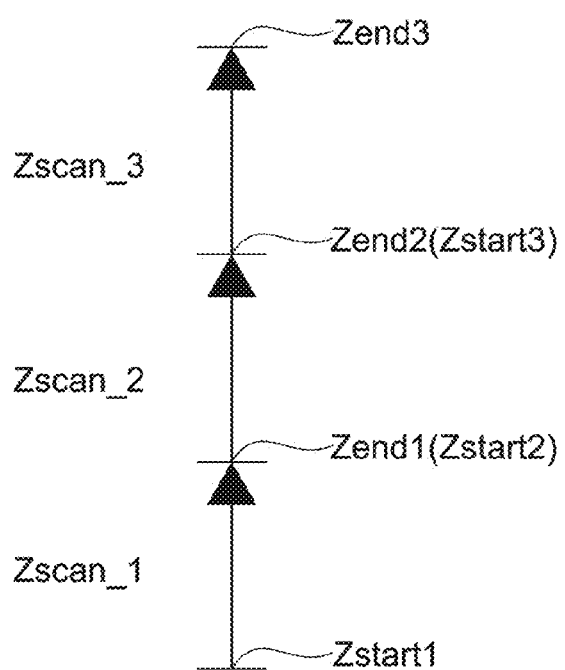

FIGS. 7A and 7B are schematic diagrams for describing in detail a movement range of the focus position according to this embodiment. As shown in FIGS. 7A and 7B, in this embodiment, a plurality of divided imaging ranges (Zscan_1 to 3) are set. The plurality of divided imaging ranges divide an imaging range L including at least a thickness range T of the sample site in the Z-axis direction. The movement control of the focus position described above is performed in each of the divided imaging ranges. Specifically, $z_{start}$ (1 to 3) and $z_{end}$ (1 to 3) are set (see FIG. 7B) for the respective divided imaging ranges.

The size of the divided imaging ranges in the Z-axis direction is 20 μm to 50 μm, for example. However, the size is not limited to those numerical values. Further, the number of divided imaging ranges is not also limited. Furthermore, the size of the imaging range L including at least the thickness range T of the sample site is not also limited.

The focus position is moved in each of the divided imaging ranges with a predetermined sample site being allocated to the imaged areas AR. Then, a fluorescent image is obtained for each of the divided imaging ranges. Thus, three fluorescent images are obtained for the predetermined sample site.

For example, three fluorescent images may be continuously obtained with the predetermined sample site being allocated to the imaged areas AR. Alternatively, the entire biological sample SPL may be imaged in one divided imaging range, and thereafter the imaging may be performed for the other divided imaging ranges.

Figure 8A:
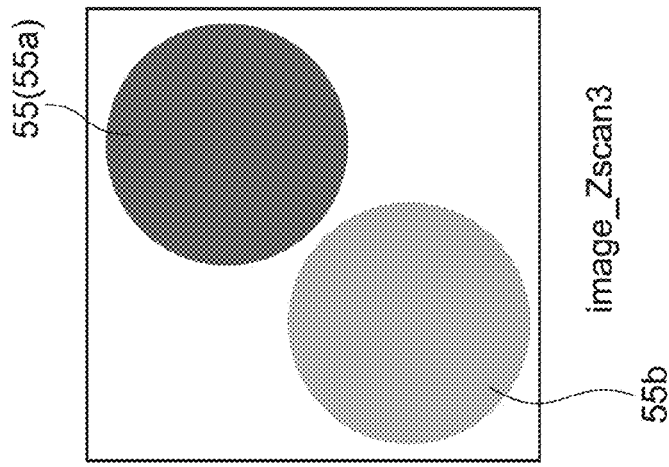
FIGS. 8A, 8B, and 8C are schematic diagrams showing fluorescent images of a sample site, which are captured in respective divided imaging ranges shown in FIGS. 7A and 7B.
Figure 8B:
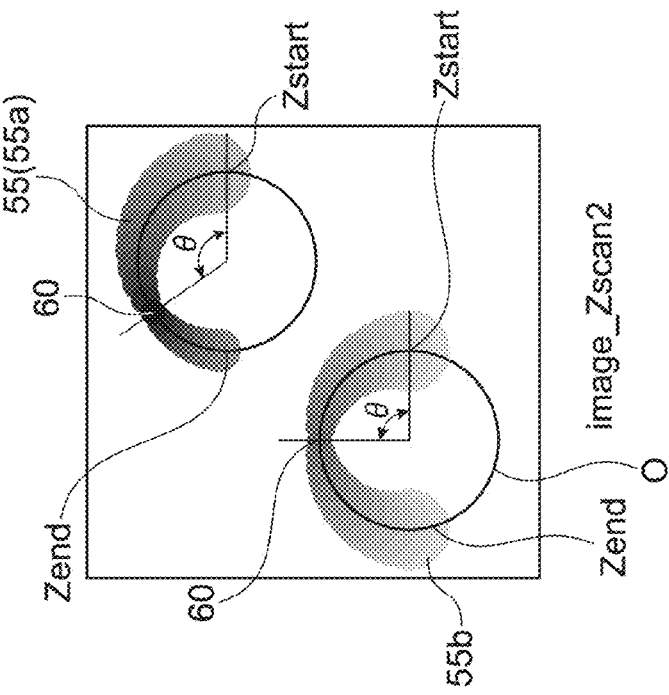
Figure 8C:
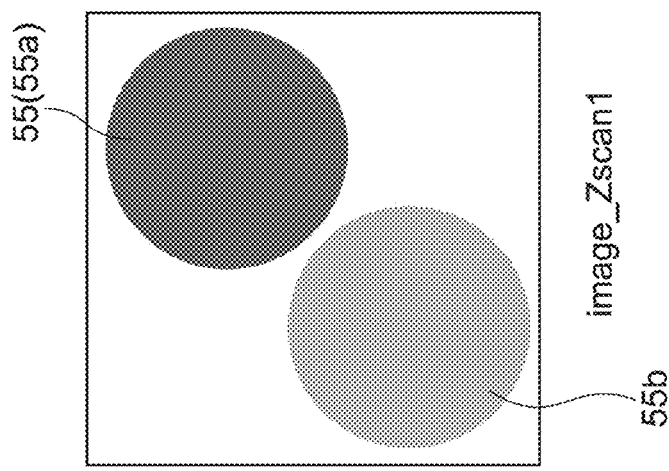
Figure 9A:
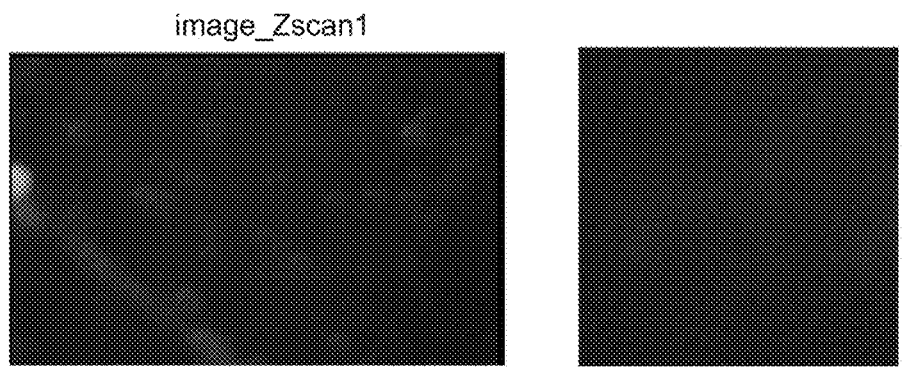
FIGS. 9A, 9B, and 9C are photographs captured as examples of the embodiment, which correspond to the fluorescent images shown in FIGS. 8A, 8B, and 8C, respectively.
Figure 9B:
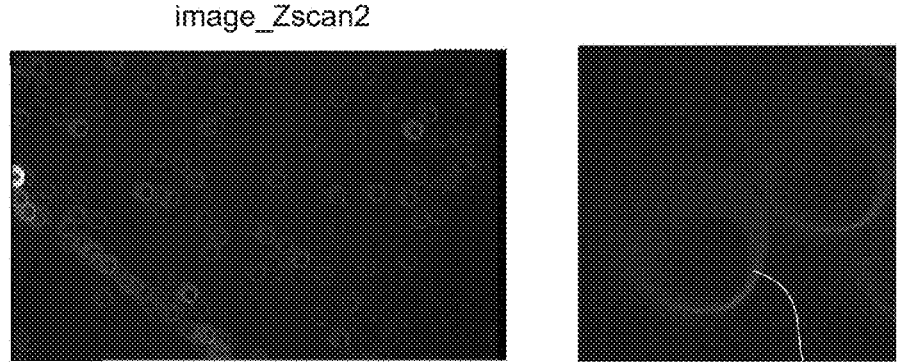
Figure 9C:
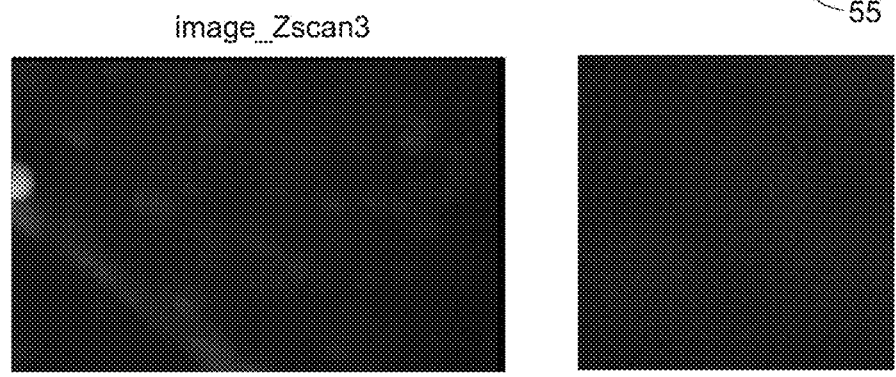

FIGS. 8A, 8B, and 8C are schematic diagrams showing fluorescent images of the sample site, which are captured in the respective Zscan_1 to Zscan_3 shown in FIGS. 7A and 7B. FIGS. 9A, 9B, and 9C are photographs obtained as examples of this embodiment, which correspond to the fluorescent images shown in FIGS. 8A, 8B, and 8C, respectively. The photographs shown in FIGS. 9A, 9B, and 9C are fluorescent images obtained under the conditions where the radius L is 15 μm, a movement amount ($z_{end}$-$z_{start}$) in the Z-axis direction is 20 μm, and a period of time during which the image sensor 14 is exposed to light to obtain an image is 1 sec. In addition thereto, an imaging condition such as a gamma value is also adjusted as appropriate.

As shown in FIGS. 7A and 7B, Zscan_1 and Zscan_3 are ranges that do not include the fluorescent markers 55 in the Z-axis direction. Thus, in an image_Zscan1 and an image_Zscan3 that are fluorescent images obtained in the above ranges, as shown in FIGS. 8 and 9, the images of the fluorescent markers 55 are very blurred (FIGS. 8A, 8C, 9A, and 9C).

On the other hand, in an image_Zscan2 that is a fluorescent image obtained in Zscan_2, the focus position is moved in the range close to the positions of the fluorescent markers 55. Thus, in the obtained image_Zscan2, as shown in FIGS. 8B and 9B, trajectories of the fluorescent markers 55 along with the movement of the focus position are imaged.

A distribution information calculating unit 33 calculates, based on the fluorescent image of the biological sample SPL, which is generated by the image obtaining unit 32, distribution information of the fluorescent markers 55 in the thickness direction of the sample site. In this embodiment, the distribution information is calculated based on the plurality of fluorescent images obtained in the respective Zscan_1, Zscan_2, and Zscan_3 shown in FIGS. 8 and 9.

Figure 10:
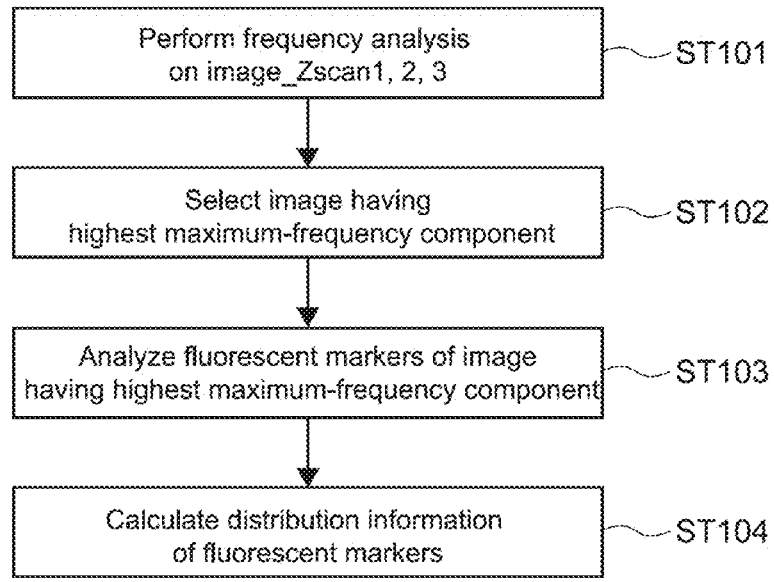
FIG. 10 is a flowchart showing an example of calculation processing by a distribution information calculating unit shown in FIG. 4.

FIG. 10 is a flowchart showing an example of calculation processing by the distribution information calculating unit 33. In this embodiment, a frequency analysis is performed on the plurality of fluorescent images obtained in Zscan_1, Zscan_2, and Zscan_3 (Step 101). Thus, a spatial frequency for each of the fluorescent images (image_Zscan1, 2, 3) is calculated.

The maximum frequency components of the respective fluorescent images are compared with one another, and a fluorescent image having the highest maximum-frequency component is selected (Step 102). As shown in FIGS. 8 and 9, the image_Zscan1 and the image_Zscan3 include blurred images of the fluorescent markers 55. On the other hand, the image_Zscan2 has an image of trajectories of the fluorescent markers 55. Thus, in Step 102, the image_Zscan2 is selected as a fluorescent image with the highest maximum-frequency component.

The image of trajectories of the fluorescent markers 55 in the image_Zscan2 having the highest maximum-frequency component is analyzed (Step 103). Specifically, in this embodiment, the shape of the fluorescent markers 55 in the image_Zscan2 is analyzed.

The distribution information calculating unit 33 detects the fluorescent marker 55 (hereinafter, referred to also as "target marker" and also described as fluorescent marker 55a) that marks the target living tissue 50 from the image_Zscan2 generated by the image obtaining unit 32.

In the distribution information calculating unit 33, for example, a color of the target marker (hereinafter, referred to as "target marker color") and a color of the fluorescent marker 55 that marks a cell nucleus (hereinafter, the fluorescent marker 55 being referred to as "nuclear marker", and the color of the fluorescent marker 55 being referred to as "nuclear marker color") are set as the setting information.

Further, in the case where the fluorescent marker 55 that marks a target gene (hereinafter referred to as "target marker" and described as fluorescent marker 55b) is used, the number of target genes in a normal cell nucleus is set. Further, in this case, a color of the fluorescent marker that marks a target gene (hereinafter, referred to as "target marker color") is also set.

Those setting information items are unambiguously defined based on the manufacturer of a probe to be used for fluorescent staining and use conditions such as types of fluorescent markers. Specifically, for example, in the case of using HER-2 DNA probe kit from Abbott Laboratories, a target marker color of a HER-2 gene is set to "red", and a nuclear marker color is set to "blue". In addition, in this case, a gene located adjacent to the HER-2 gene on a chromosome is set to a target gene, and the target marker color of the target gene is set to "green".

The distribution information calculating unit 33 detects the fluorescent markers 55 having the set marker colors and brightness larger than a threshold value, to thereby detect the shape (area) of the fluorescent markers 55, the number of fluorescent markers 55, and the like. Then, the distribution information calculating unit 33 analyzes the shape of the fluorescent marker 55, to thereby calculate distribution information of the plurality of fluorescent markers 55.

FIG. 8B shows two fluorescent markers 55a and 55b as an example. As described above, in a period of time during which the focus position of the optical system 12 is moved, the image sensor 14 is exposed to light so that the image_Zscan2 is generated. Since the focus position is circularly moved on the X-Y plane that is a plane direction of the stage 11, the fluorescent markers 55a and 55b are moved along a circle O. Specifically, the trajectories of the fluorescent markers 55a and 55b each describe a semicircle starting from the movement start position of the focus, $z_{start}$, to the movement end position thereof, $z_{end}$ (here, a case where the focus position is moved on a semicircle during the exposure time is shown).

The focus position of the optical system 12 is also upwardly moved in the range of the Zscan_2 in the Z-axis direction. During the movement, each of the fluorescent markers 55a and 55b is most in focus at any focus position. In a state of being most in focus, the images of the fluorescent markers 55a and 55b each have a smallest area and a highest brightness. An image having a smallest area will be described as an in-focus image 60.

In this embodiment, an angle θ formed from the start position $z_{start}$ to the in-focus image 60 is calculated so that distribution information of the fluorescent markers 55 in the thickness direction of the sample site is calculated based on the angle θ.

For example, in the fluorescent marker 55b shown in FIG. 8B, the in-focus image 60 exists at a middle position of the trajectory of the fluorescent marker 55b, which describe a semicircle. The angle θ is about 90 degrees. In this case, when the focus position is moved to the middle of the Zscan_2, the fluorescent marker 55b is most in focus. Thus, it is found that the fluorescent marker 55b is located at the middle of the Zscan_2.

In the other fluorescent marker 55a, the in-focus image 60 exists at a position close to the end position $z_{end}$ from the middle position of the trajectory of the fluorescent marker 55a, which describe a semicircle. The angle θ is about 135 degrees. In this case, when the focus position passes beyond the middle of the Zscan_2 to move to the upper part, the fluorescent marker 55a is most in focus. Thus, it is found that the fluorescent marker 55a is located at the upper side of the Zscan_2.

As the angle θ from the start position $z_{start}$ to the in-focus image 60 becomes smaller, the fluorescent marker 55 is located at a position closer to the start position $z_{start}$. Specifically, the fluorescent marker 55 is located on a side closer to the stage 11 within the biological sample SPL.

On the other hand, as the angle θ becomes larger, the fluorescent marker 55 is located at a position closer to the end position $z_{end}$. Specifically, the fluorescent marker 55 is located on a side distant from the stage 11 within the biological sample SPL.

Figure 11:
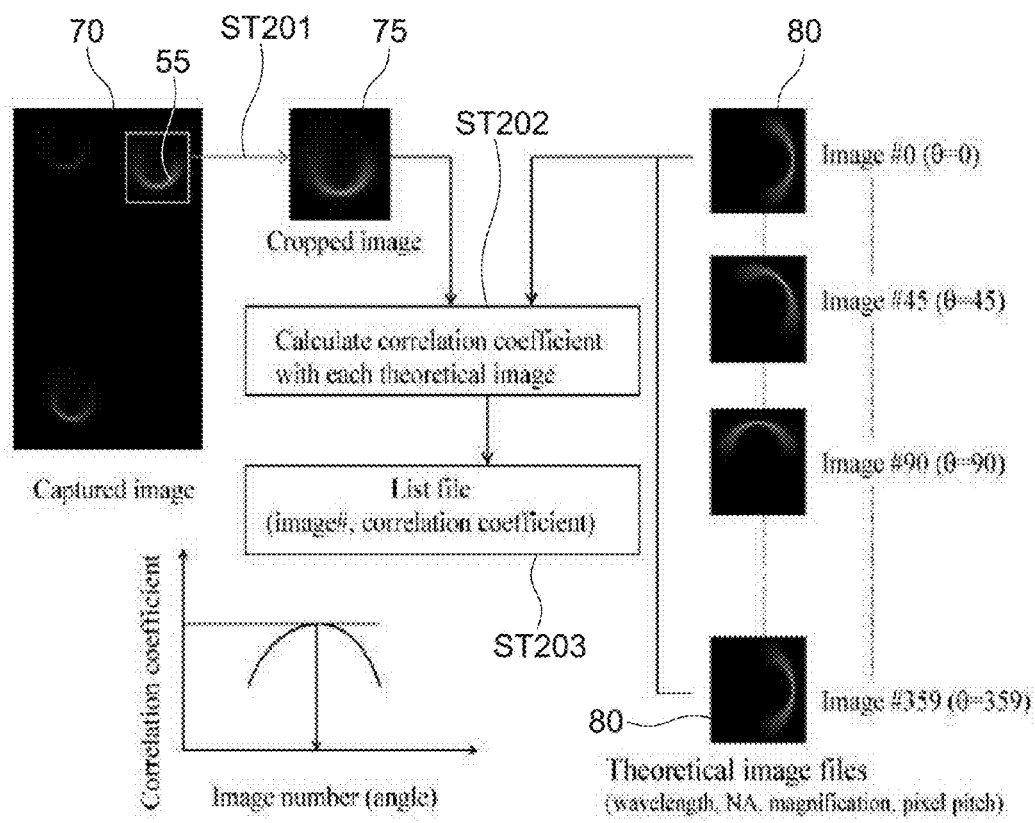
FIG. 11 is a diagram showing an example of the processing of calculating an angle θ from a start position to an in-focus image in the embodiment.

FIG. 11 is a diagram showing an example of the processing of calculating the angle θ from the start position $z_{start}$ to the in-focus image 60 in this embodiment.

An image of a fluorescent marker 55, which is to be analyzed, is cut from a captured image 70 by trimming processing (Step 201). The cut, trimmed image 75 is subjected to matching processing with theoretical images.

As shown in FIG. 11, in this embodiment, a file of theoretical images is stored in the storage 27 or the like. In this file, a plurality of theoretical images 80 are stored. The plurality of theoretical images 80 are associated with angles from 0 degrees to 359 degrees. In this embodiment, the magnitude of an angle associated to a theoretical image 80 is an identification number of the theoretical image 80.

A wavelength, a numerical aperture, a magnification, a pixel pitch, and the like for creating the theoretical images 80 may be set as appropriate. Further, which angle is set to 0 degrees, by what degrees theoretical images are prepared, and the like may be set as appropriate. For example, in the case where the theoretical images 80 are prepared by one degree, 359 theoretical images 80 are created.

Correlation coefficients between those theoretical images 80 and the trimmed image 75 are calculated (Step 202). Then, an identification number of a theoretical image 80 with the highest correlation coefficient is calculated (see the graph of FIG. 11). For each of the plurality of fluorescent markers 55 of the captured image 70, the identification number of the theoretical image 80 with the highest correlation coefficient is calculated. A list of the identification numbers associated with the plurality of fluorescent markers 55 is generated and stored in the storage 27 or the like (Step 203).

Based on the identification numbers (angles) of the theoretical images 80, which have been calculated to correspond to the respective fluorescent markers 55, the above-mentioned angle θ from the start position $z_{start}$ to the in-focus image 60 is calculated as appropriate. For example, the theoretical images 80 may be prepared such that the angle θ coincides with an angle as the identification number. Alternatively, the shape of the fluorescent marker 55 may be determined based on the angle as the identification number, and then the angle θ may be calculated from the start position $z_{start}$ to the in-focus image 60 anew. It should be noted that the method of calculating the angle θ from the start position $z_{start}$ to the in-focus image 60 is not limited to the one shown in FIG. 11, and other methods may be used.

Based on the angles θ from the start position $z_{start}$ to the in-focus image 60, which have been calculated for the plurality of fluorescent markers 55, the distribution information of the fluorescent markers 55 in the thickness direction of the sample site is calculated (Step 104). Specifically, in this embodiment, position information in the Z-axis direction is calculated for each fluorescent marker 55. Thus, the distribution information of the plurality of fluorescent markers 55 is calculated.

Figure 12:
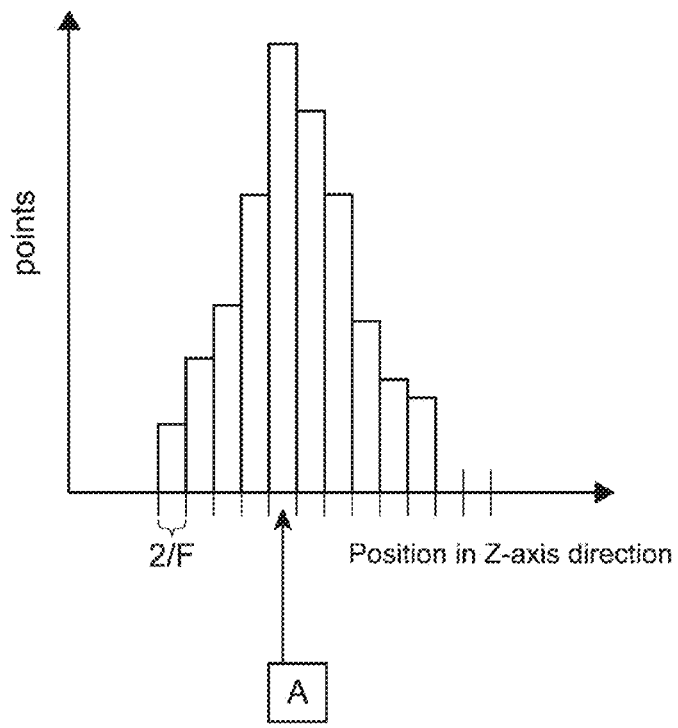
FIG. 12 is a graph showing an example of distribution information of a plurality of fluorescent markers according to the embodiment.
Figure 13:
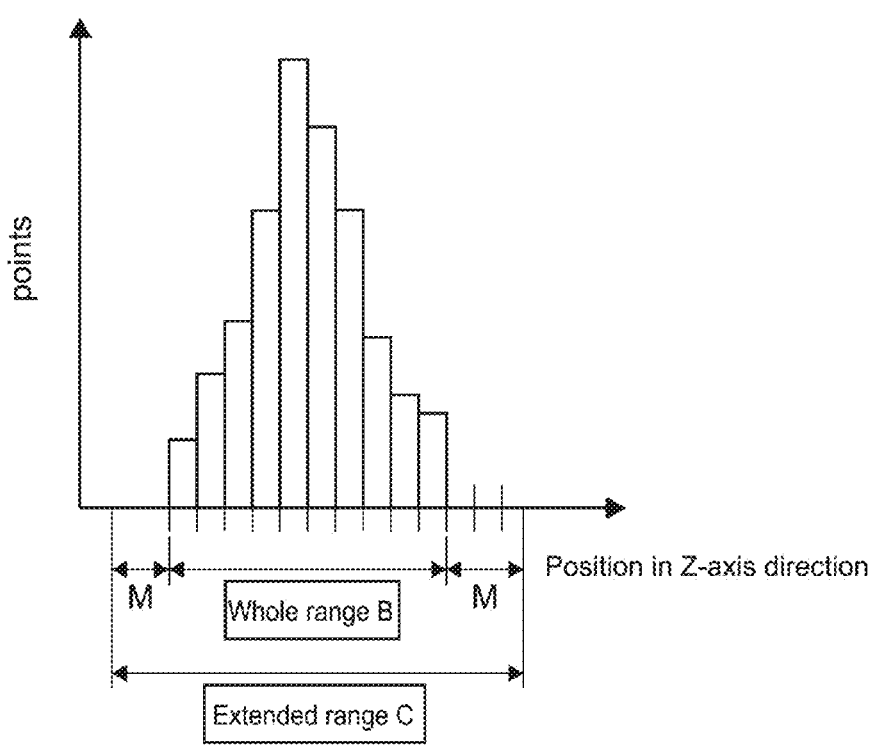
FIG. 13 is another graph showing an example of the distribution information of the plurality of fluorescent markers according to the embodiment.
Figure 14:
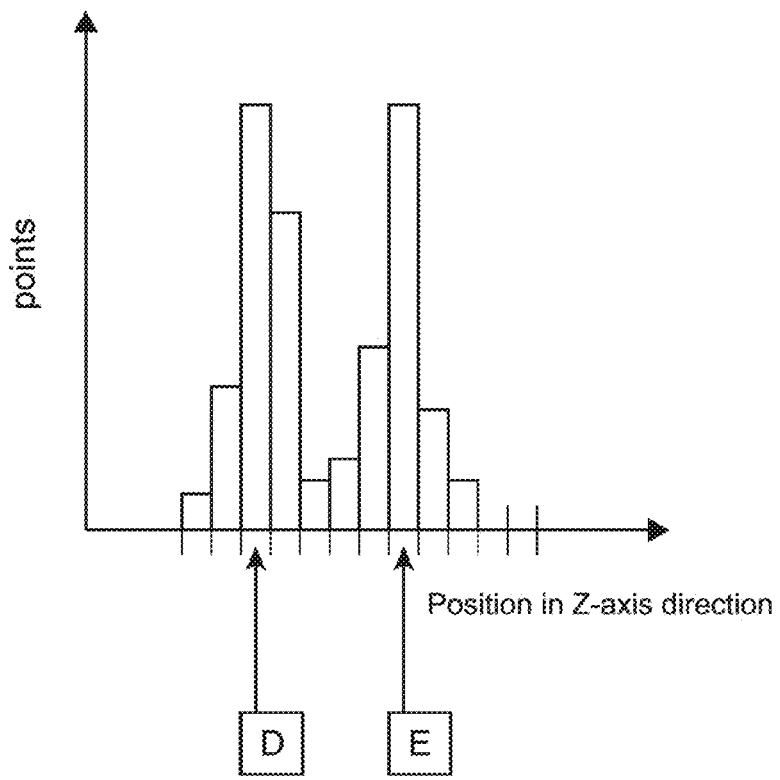
FIG. 14 is another graph showing an example of the distribution information of the plurality of fluorescent markers according to the embodiment.

FIGS. 12, 13, and 14 are graphs each showing an example of the distribution information of the plurality of fluorescent markers 55. In this manner, the distribution information of the fluorescent markers 55 is capable of being generated as data in the form of histogram. In those graphs, the horizontal axis represents the position in the Z-axis direction, and the vertical axis represents the number of fluorescent markers 55.

In this embodiment, the horizontal axis is sectioned by the half size of a focal depth F of the objective lens (F/2) so that the number of fluorescent markers 55 included in the respective ranges is counted. The resolution of the horizontal axis is not limited to F/2, and a value smaller than the focal depth only has to be set as appropriate. Further, a value larger than the focal depth may be set.

Specifically, the focus position of the optical system 12 is set to be in a certain range of the horizontal axis, in-focus images of the fluorescent markers 55 included in the range are obtained. The fluorescent markers 55 included in other ranges are imaged in a more blurred way, as those fluorescent markers 55 are located farther from the focus position.

Based on such distribution information of the fluorescent markers 55, the biological sample SPL is imaged. The distribution information of the fluorescent markers 55 is referable, which allows an effective, highly accurate imaging that matches an imaging mode or an imaging purpose to be performed.

For example, it is assumed that a fluorescent image having a certain number of fluorescent markers 55 being in focus, out of the plurality of the fluorescent markers 55 that are present in the biological sample SPL, is obtained. In this case, it is determined that as shown in FIG. 12, it suffices to perform imaging once with the focus position being set at a position A, the position A being included in a range where a largest number of fluorescent markers 55 is included. Thus, a highly accurate fluorescent image can be obtained.

In order to quantitatively observe the whole number of fluorescent markers 55 included in the biological sample SPL, the types thereof, and the like, in this case, a whole range B where the fluorescent markers 55 are located is calculated based on the distribution information and then scanned, to thereby obtain a fluorescent image in which all the fluorescent markers 55 are imaged.

For example, in a period of time during which the focus position is moved from a start point to an end point of the whole range B, the image sensor 14 may be exposed to light so that one fluorescent image is obtained. Alternatively, as shown in FIG. 13, the focus position may be moved in an extended range C including the whole range B and predetermined margins M on both sides of the whole range B. Thus, the fluorescent markers 55 located at the middle of the whole range B and the fluorescent markers 55 located at ends are substantially similarly imaged in a blurred manner. In other words, the fluorescent markers 55 as a whole are imaged at substantially the same size and brightness so that accuracy of measuring the fluorescent markers 55 can be improved.

There is an imaging mode in which a plurality of fluorescent images are obtained for one sample site at different focus positions in the Z-axis direction, which is called Z-stack. Even in the case where the Z-stack is performed, the distribution information may be used as appropriate. For example, when the whole range B shown in FIG. 13 is referred to, a range on which the Z-stack is to be performed is defined. Further, with reference to the graphs, intervals between different focus positions, the number of obtained images, and the like are set as appropriate. For example, the Z-stack may be executed based on the ranges obtained by sectioning the horizontal axis. In this manner, with reference to the distribution information, a highly accurate fluorescent image is obtained.

As shown in FIG. 14, there may be obtained a graph in which the distribution of the fluorescent markers 55 has two peaks. In other words, there is a case where the fluorescent markers 55 are concentrated in the vicinity of two different positions, for example. In such a case, the imaging may end in failure if the imaging is performed once at the middle position under the condition where a certain number of fluorescent markers 55 are in focus.

When the distribution information is referred to, a position D and a position E included in the respective peaks are calculated as focus positions. The focus position is set to those positions D and E and the imaging is executed twice, with the result that a highly accurate fluorescent image is obtained without undergoing a failed imaging.

A data recording unit 34 shown in FIG. 4 combines the biological sample images of the respective sample sites, which have been generated by the image obtaining unit 32, to thereby generate one biological sample image. Then, the data recording unit 34 encodes the biological sample image into sample data in a predetermined compression form such as JPEG (Joint Photographic Experts Group) to store the data in a data storage 35. This processing may be performed before the calculation of the distribution information by the distribution information calculating unit 33.

Further, the data recording unit 34 receives the distribution information calculated by the distribution information calculating unit 33 and stores the distribution information data in the data storage 35 in association with the sample data.

In addition, the data storage 35 may store, for example, measurement result data of the fluorescent markers 55 by the distribution information calculating unit 33 (area, number, type, and the like of fluorescent markers), and information such as a name of a person who extracted the biological sample SPL, a gender of the person, the age of the person, and a date and time of the extraction.

As described above, in the image obtaining apparatus 100 according to this embodiment, the focus position of the optical system 12 is moved in the imaging range L including at least the thickness range T of the sample site. During the movement, the image sensor 14 is exposed to light so that a fluorescent image of the biological sample SPL is obtained. Then, based on the fluorescent image of the biological sample SPL, the distribution information of the fluorescent markers 55 in the thickness direction (Z-axis direction) of the sample site is calculated. Thus, for example, the focus position for appropriately imaging the fluorescent markers 55, which matches an imaging mode or an imaging purpose, is easily calculated. As a result, the biological sample SPL having the fluorescent markers 55 is efficiently imaged.

For example, a method of changing the focus position at intervals smaller than the focal depth to perform imaging for each change and analyzing the captured images to retrieve a focus position is conceived. In this method, it is necessary to capture a large number of images and use a large-capacity memory for storing image data corresponding to the captured images. Further, it is necessary to refer to a plurality of image data items in order to calculate the focus position, which is inefficient because a lot of man-hours are involved.

Specifically, in the case where NA is set to 0.8, the focal depth is about 1 μm. Then, a plurality of images are obtained while changing the focus position by, for example, 1 μm in order to search for the focus position. The images are analyzed to search for the focus position. In this case, when the measurement is performed on the range exceeding 50 μm while changing the focus position by 1 μm, it is necessary to capture 50 images or more and stores those images. In the case where an imager with 14 bits and 24 Mpixs is used, a file of one image has the capacity of about 100 MB in the tif system. Thus, in the case where 50 images or more are processed, a memory having the capacity of 5 GB or larger is to be used, which makes the processes complicated.

In this embodiment, as shown in FIGS. 7, Zscan_1, Zscan_2, and Zscan_3 are set as three divided imaging ranges. In this way, the range larger than the focal depth is set, and the distribution information is calculated by a smaller number of times of imaging. Thus, the search for the focus position with the largely reduced number of images is performed.

Figure 15:
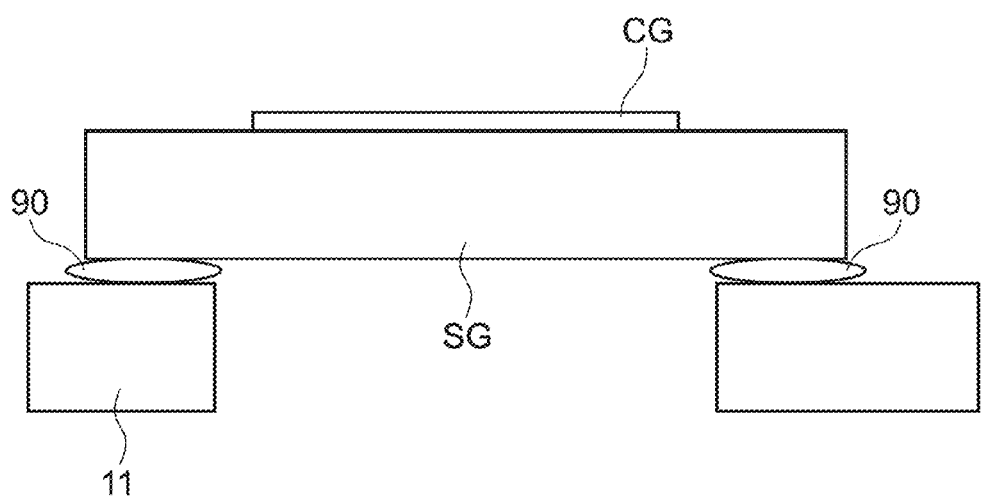
FIG. 15 is a schematic diagram showing a state in which dust and the like are caught between a slide glass and the stage.

In FIGS. 7, the imaging range L including the ranges where the biological sample SPL is not located is set (Zscan_1 and 3). For example, as shown in FIG. 15, dust 90 such as a hair (with the size of, for example, about 20 μm to 50 μm) may be caught between the slide glass SG and the stage 11. In such a case, for example, the focus position may be lost if only the thickness of the slide glass SG is taken into consideration to set the imaging range L. Thus, with the appropriate setting of the imaging range L including the ranges where the biological sample SPL is not located, the distribution information of the fluorescent markers 55 is highly accurately calculated. As described above, the focus position is retrieved with the smaller number of images, with the result that the imaging range L can be set to be large.

In the case where the focus position is automatically retrieved and adjusted, the following error may occur: dust on the imager and defects of the imager may be erroneously recognized to be fluorescent bright points on the slide glass SG, and a different focus position is determined to be an in-focus position.

In this embodiment, in Steps 101 and 102 of FIG. 10, the spatial frequencies of the respective image_Zscan1, image_Zscan2, and image_Zscan3 are calculated, and an image with the highest maximum-frequency is selected. By analyzing and comparing the frequency components, an image including the in-focus image 60 of the fluorescent marker 55 (image_Zscan2) is selected without receiving any influence from dust on the imager (image sensor 14), defects of the imager, and the like.

<Modified Examples>

The embodiment of the present disclosure is not limited to the embodiment described above and may be variously modified.

Figure 16:
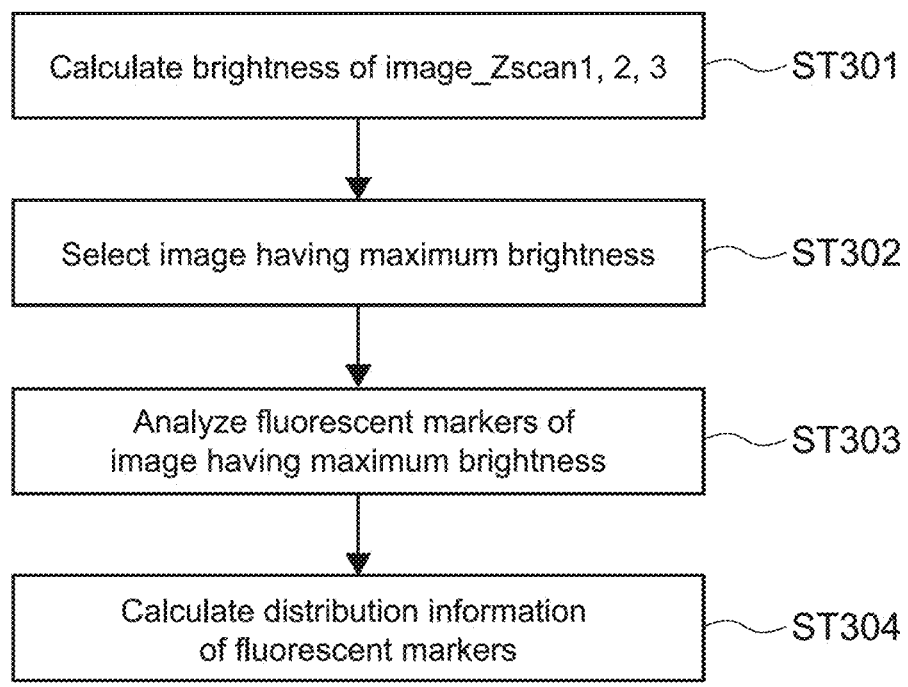
FIG. 16 is a flowchart showing a modified example of the calculation processing, by the distribution information calculating unit, shown in FIG. 10.

FIG. 16 is a flowchart showing a modified example of the calculation processing by the distribution information calculating unit 33 shown in FIG. 10. In this modified example, the brightness in each of the image_Zscan1, image_Zscan2, and image_Zscan3 is calculated (Step 301). Then, a fluorescent image having the maximum brightness is selected (Step 302), and the processing of analyzing the fluorescent markers is performed on the fluorescent image (Step 303). In this manner, based on the brightness of the fluorescent image captured in each of the plurality of divided imaging ranges, a fluorescent image, which is a target of the processing of calculating the distribution information, may be selected. Thus, an amount of computation is suppressed.

In the embodiment described above, as shown in FIGS. 7, the plurality of divided imaging ranges that divide the imaging range L are set, and the fluorescent image is captured for each of the divided imaging ranges. However, the stage may be moved within the entire imaging range L so that a fluorescent image is generated in one time of imaging. Then, based on the fluorescent image, the distribution information of the fluorescent markers 55 may be calculated.

For example, the imaging may be performed once on the imaging range L with the size of about 100 μm. Thus, the reduction in amount of computation, the increase in processing speed, and the like are achieved. Whether the divided imaging ranges are set or not may be determined based on, for example, the size of the imaging range L and the accuracy of the image sensor 14.

In the above description, the distribution information is used as appropriate in accordance with an imaging mode or an imaging purpose. Conversely, based on the distribution information, an optimum imaging mode or imaging purpose may be selected. For example, the following determining processing may be performed: in the case where the plurality of fluorescent markers 55 are concentrated in the range of the focal depth, one time of imaging with a fixed focus position is selected, and in the case where the plurality of fluorescent markers 55 are diffused, Z-stack imaging is selected. In this case, for example, the data processing unit 20 functions as an imaging mode determining unit.

Further, out of the fluorescent markers 55, only the target markers (red) or target markers (green) may be set as target for distribution information calculation. The setting therefor may be input by an operation of a user, for example.

Furthermore, the position information may not be calculated for all the fluorescent markers 55 imaged in the fluorescent image. Specifically, the fluorescent markers 55 may be thinned out and selected and based on the position information thereof, the distribution information may be calculated.

Note that, in the structure of the microscope 10 of the above-mentioned embodiment, the objective lens 12A may be an eyepiece lens.

Further, in the above-mentioned embodiment, the stage 11 is moved to move the focus position. Alternatively, the objective lens 12A of the optical system 12 may be moved.

In the above-mentioned embodiment, the data processing unit 20 includes the data storage 35, and biological-sample images, the distribution information of the fluorescent markers 55, and the like are recorded in the data storage 35. Alternatively, they may be recorded in external storage.

The microscope 10 may be connected to the data processing unit 20 not by a bus transmission path but by a wired or wireless transmission medium such as a local area network, the Internet, or digital satellite broadcasting.

Note that the present disclosure may employ the following structures.

(1) An image obtaining apparatus, including:
a light source configured to irradiate a biological sample having a fluorescent label with excitation light, the excitation light exciting the fluorescent label;
an optical system including an objective lens, the objective lens being configured to magnify an imaging target of the biological sample;
an image sensor configured to form an image of the imaging target magnified by the objective lens;
a movement controller configured to move a focus position of the optical system in an imaging range including at least a range corresponding to the thickness of the imaging target; and
a data processing unit configured to exposure the image sensor to light while moving the focus position in the imaging range and obtain a fluorescent image of the biological sample, to thereby calculate distribution information of the fluorescent label in a thickness direction of the imaging target based on the fluorescent image.

(2) The image obtaining apparatus according to (1), in which
the movement controller is configured to move the focus position in the thickness direction of the imaging target and move the focus position in a plane direction vertical to the thickness direction.

(3) The image obtaining apparatus according to (1) or (2), in which
the data processing unit is configured to calculate the distribution information based on a shape of the fluorescent label of the fluorescent image.

(4) The image obtaining apparatus according to any one of (1) to (3), in which
the movement controller is configured to move the focus position of the optical system in each of a plurality of divided imaging ranges that divide the imaging range in the thickness direction of the imaging target, and
the data processing unit is configured to calculate the distribution information based on a plurality of fluorescent images obtained in the plurality of divided imaging ranges.

(5) The image obtaining apparatus according to (4), in which
the data processing unit is configured to calculate a frequency component of each of the plurality of fluorescent images and calculate the distribution information based on a fluorescent image having a highest maximum-frequency component.

(6) The image obtaining apparatus according to (4), in which
the data processing unit is configured to calculate a brightness of each of the plurality of fluorescent images and calculate the distribution information based on a fluorescent image having a maximum brightnesss.

(7) The image obtaining apparatus according to any one of (1) to (6), further including an imaging mode determining unit configured to determine an imaging mode for the biological sample based on the calculated distribution information.

The present disclosure contains subject matter related to that disclosed in Japanese Priority Patent Application JP 2011-260271 filed in the Japan Patent Office on Nov. 29, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image obtaining apparatus, comprising:
a light source configured to irradiate a biological sample having a fluorescent label with excitation light, the excitation light exciting the fluorescent label;
an optical system including an objective lens, the objective lens being configured to magnify an imaging target of the biological sample;
an image sensor configured to form an image of the imaging target magnified by the objective lens;
a movement controller configured to move a focus position of the optical system in an imaging range including at least a range corresponding to the thickness of the imaging target; and
a data processing unit configured to expose the image sensor to light while moving the focus position in a thickness direction and a plane direction perpendicular to the thickness direction at the same time to obtain a fluorescent image of the biological sample and calculate distribution information of the fluorescent label in the thickness direction of the imaging target based on analyzing a shape of the fluorescent label in the fluorescent image.

2. The image obtaining apparatus according to claim 1, wherein
the movement controller is configured to move the focus position in the thickness direction of the imaging target and move the focus position in the plane direction perpendicular to the thickness direction.

3. The image obtaining apparatus according to claim 1, wherein
the shape of the fluorescent label in the fluorescent image corresponds to a trajectory of the fluorescent label based on the focus position of the optical system moving in the imaging range.

4. The image obtaining apparatus according to claim 1, wherein
the movement controller is configured to move the focus position of the optical system in each of a plurality of divided imaging ranges that divide the imaging range in the thickness direction of the imaging target, and
the data processing unit is configured to calculate the distribution information based on a plurality of fluorescent images obtained in the plurality of divided imaging ranges.

5. The image obtaining apparatus according to claim 4, wherein
the data processing unit is configured to calculate a frequency component of each of the plurality of fluorescent images and calculate the distribution information based on a fluorescent image having a highest maximum-frequency component.

6. The image obtaining apparatus according to claim 4, wherein
the data processing unit is configured to calculate a brightness of each of the plurality of fluorescent images and calculate the distribution information based on a fluorescent image having a maximum brightness.

7. The image obtaining apparatus according to claim 1, further comprising an imaging mode determining unit configured to determine an imaging mode for the biological sample based on the calculated distribution information.

8. An image obtaining method, comprising:
irradiating a biological sample having a fluorescent label with excitation light, the excitation light exciting the fluorescent label;
moving a focus position of an optical system in an imaging range including at least a range corresponding to the thickness of an imaging target of the biological sample, the optical system including an objective lens configured to magnify the imaging target;
exposing an image sensor to light while moving the focus position in a thickness direction and a plane direction perpendicular to the thickness direction at the same time to obtain a fluorescent image of the biological sample, the image sensor being configured to form an image of the imaging target magnified by the objective lens; and
calculating distribution information of the fluorescent label in the thickness direction of the imaging target based on analyzing a shape of the fluorescent label in the obtained fluorescent image.

9. At least one non-transitory computer readable storage medium storing computer-executable instructions that, when executed, perform a method of obtaining an image, the method comprising:
irradiating a biological sample having a fluorescent label with excitation light from a light source, the excitation light exciting the fluorescent label;
moving a focus position of an optical system in an imaging range including at least a range corresponding to the thickness of an imaging target of the biological sample, the optical system including an objective lens configured to magnify the imaging target;
exposing an image sensor to light while moving the focus position in a thickness direction and a plane direction perpendicular to the thickness direction at the same time and to obtain a fluorescent image of the biological sample, the image sensor being configured to form an image of the imaging target magnified by the objective lens; and
calculating distribution information of the fluorescent label in the thickness direction of the imaging target based on analyzing a shape of the fluorescent label in the obtained fluorescent image.

10. The image obtaining apparatus according to claim 1, wherein the imaging range further includes a plane direction perpendicular to the thickness direction.

11. The image obtaining apparatus according to claim 2, wherein the movement controller is further configured to move the focus position of the optical system in the plane direction perpendicular to the thickness direction and the thickness direction at the same time.

12. The image obtaining apparatus according to claim 11, wherein the data processing unit is further configured to expose the image sensor to light while moving the focus position such that each position along the thickness direction corresponds to a different position in the plane direction.

* * * * *